United States Patent [19]

Jackson

[11] 3,861,650

[45] Jan. 21, 1975

[54] STRINGING PULLER

[75] Inventor: Richard L. Jackson, Lewisburg, Ohio

[73] Assignee: Jackson Communication Corp., Clayton, Ohio

[22] Filed: Jan. 26, 1973

[21] Appl. No.: 326,834

[52] U.S. Cl............................ 254/134.3 R, 188/65.1
[51] Int. Cl.............................................. H02g 1/02
[58] Field of Search....... 254/134.3 R, 134.5, 134.6; 24/134 R; 212/108, 122; 188/65.1, 65.2, 65.4, 65.5

[56] References Cited
UNITED STATES PATENTS

| 1,107,934 | 8/1914 | Hagan | 24/134 R UX |
|---|---|---|---|
| 2,613,257 | 10/1952 | Wollet | 254/134.3 R |
| 3,596,878 | 8/1971 | Parsen | 254/134.3 R |
| 3,672,636 | 6/1972 | Parsen | 254/134.3 R |

FOREIGN PATENTS OR APPLICATIONS

| 505,064 | 8/1930 | Germany | 212/122 |

Primary Examiner—Donald G. Kelly
Assistant Examiner—K. J. Ramsey
Attorney, Agent, or Firm—Biebel, French & Bugg

[57] ABSTRACT

A stringing puller for stringing aerial cable from an existing messenger strand includes a spring loaded brake which is urged into engagement with the messenger strand along which the puller is towed. A link extends from the brake and is engaged at its opposite end by a ring to which a tow line is attached. Therefore, when the puller is being towed along the messenger, the link is also pulled forward, overcoming the spring loading urging the brake into engagement with the messenger strand so that the brake does not engage the strand during towing. However, if the towing tension is relaxed sufficiently the brake will move into locking engagement with the messenger and prevent retrograde movement of the puller.

11 Claims, 8 Drawing Figures

Patented Jan. 21, 1975

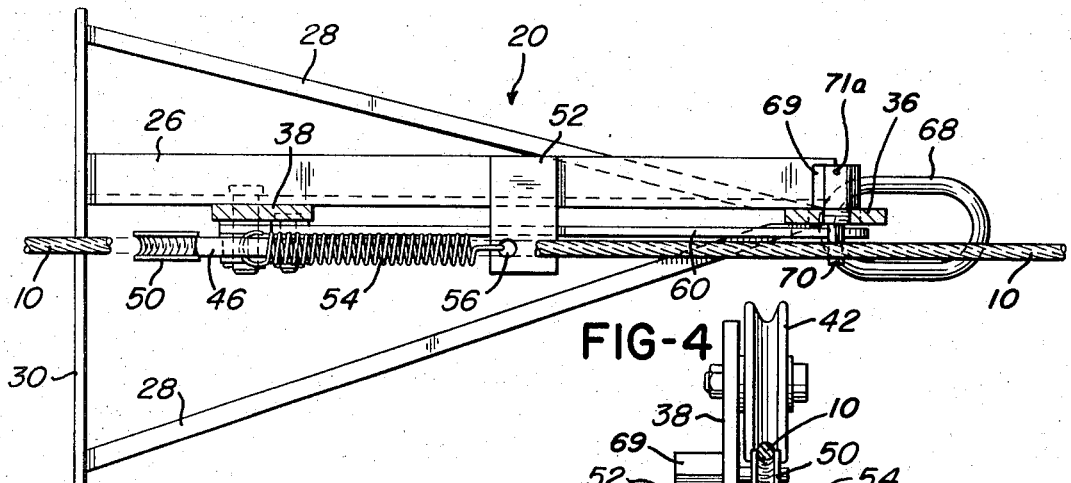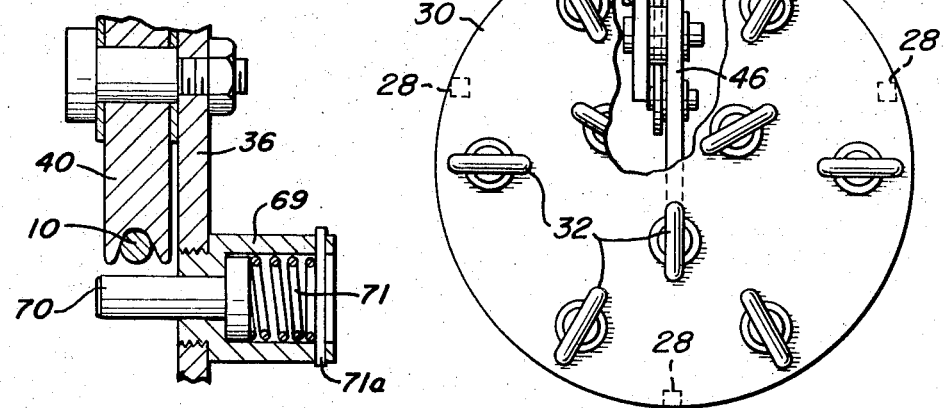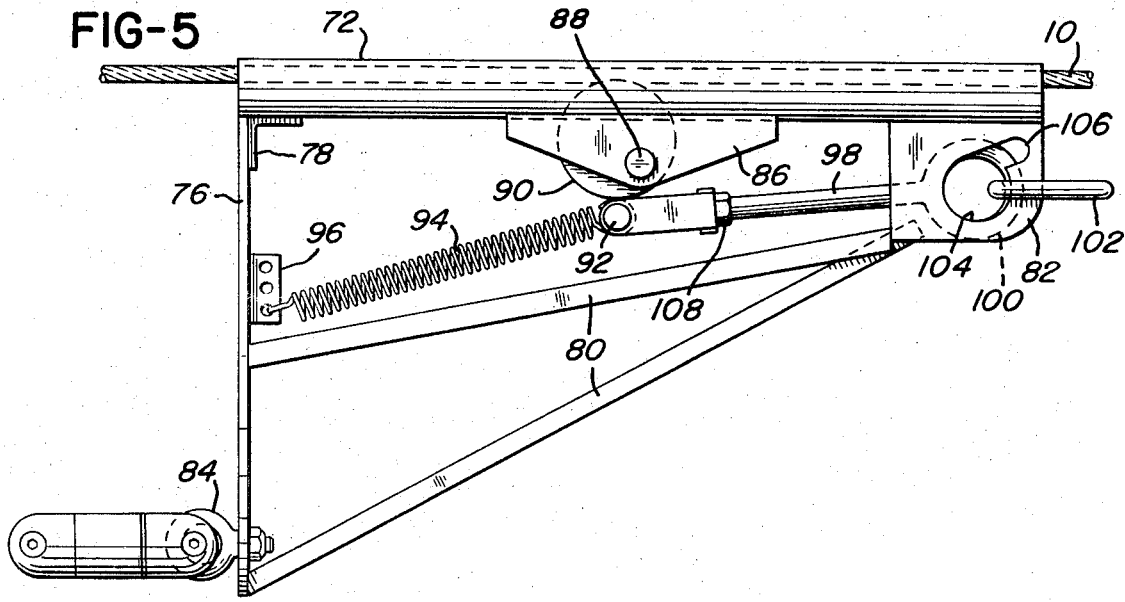

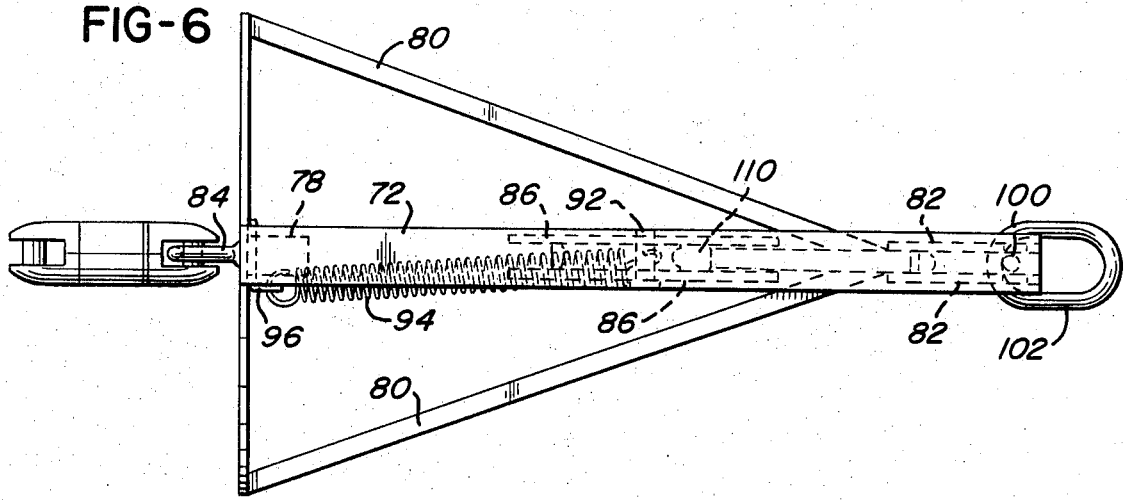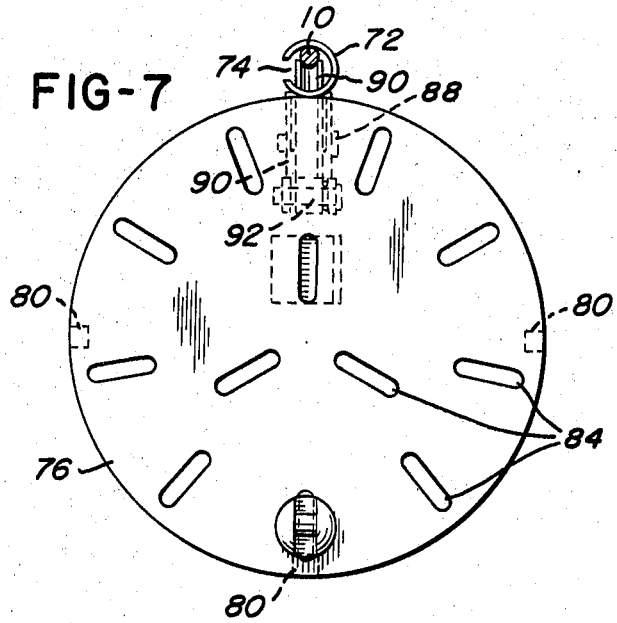

STRINGING PULLER

BACKGROUND OF THE INVENTION

In installing aerial cable, several different types of pulling devices may be utilized. In many of these a towing line is attached to one end of the puller and several cables are attached to the opposite end thereof. U.S. Pat. No. 3,276,744, for example, discloses a puller of this general type used to string cables between transmission line towers.

In contrast to the type of installation shown in the above noted patent, it is often desirable to string a cable or cables from an existing messenger strand. In this type of operation the puller is provided with roller or slide means which engage the messenger and suspend the puller therefrom. The cables to be installed are attached to one end of the puller and a tow line is attached to the other end thereof. The puller may then be towed along the messenger, stringing the cables on temporary supports, which are also suspended from the messenger, until a permanent lashing can be applied.

It will be apparent that if the tension applied to the tow line is relaxed accidentally, as might happen if the tow line snapped or the power source for the tow line failed, the weight of the cable or cables being towed would cause the puller to move rapidly in the direction opposite to the direction of tow, possibly resulting in personal injuries, damage to the cables being installed and the cable stringing equipment, or both.

Additionally, braking action is required during routine cable stringing operations. Thus, each time a pole is encountered, pulling is stopped temporarily while the puller is disengaged from strand, moved past the pole, reengaged, and pulling begun as before.

A cable stringing operation in which the cables are suspended from an existing messenger is shown in U.S. Pat. Nos. 3,596,878 and 3,672,636. In both of these patents a puller is utilized which is adapted to be towed along an existing messenger strand with the cable or cables being installed attached to the puller by towing swivels or the like. To prevent unwanted retrograde movement of the puller, a cam member is provided which is spring loaded into engagement with the messenger and drags along the messenger as the puller is towed.

However, with this type of construction, it will be apparent that the constant engagement of the cam with the messenger cable results in wear to both the messenger cable and the cam itself. While this might not be significant for a fairly short distance of travel, it will be appreciated that in conventional cable straining operations the length of each span will be in excess of 100 feet and a normal run will consist of several such spans. In such situations, the damage induced by the constant frictional engagement of the cam with the messenger can be significant.

SUMMARY OF THE INVENTION

A stringing puller in accordance with the present invention includes means for engaging a messenger strand along which the puller is towed, one or more, preferably several, towing swivels mounted on a rear plate of the puller, and a towing ring attached to a forward end thereof. A brake is pivotally or rotatably mounted on the puller framework and urged into engagement with the messenger strand by resilient means, such as a coil spring. A link is also attached at one of its ends to the brake and at its opposite end to the towing ring.

Therefore, when a towing force is exerted on the towing ring the link is pulled forward, pivoting the brake out of engagement with the messenger strand. However, if for any reason the tension applied to the puller by the tow line is decreased sufficiently to allow the spring tension on the brake to exceed the towing tension, the brake will pivot into engagement with the messenger and prevent retrograde movement of the puller along the messenger.

In accordance with one preferred embodiment of the invention, the messenger engaging portion of the puller includes a pair of spaced apart grooved rollers which ride along the messenger as the puller is towed. The brake includes a lever arm having a grooved brake pad on one end which is urged into engagement with the messenger at a point opposite one of the grooved rollers.

The link, which is pivotally attached to the lever arm at one of its ends, has its opposite end provided with an elongated opening through which the towing ring extends. With this elongated opening in the link, the lower end of the lever can be pivoted forwardly, allowing the grooved brake pad to clear the messenger so that the messenger can be removed from the groove of the roller with which the brake pad cooperates. However, in normal towing operations, although the grooved brake pad is held out of contact with the messenger, it is positioned closely enough to the messenger to prevent inadvertent displacement of the messenger from that groove roller.

A spring loaded pin is mounted beneath the other of the grooved rollers and in its extended position retains the messenger in the groove of that roller against inadvertent displacement. However, the messenger may be removed from this roller groove quite readily by simply pressing the spring loaded pin inwardly. During normal operations, however, it will be seen that the grooved brake pad and the spring loaded pin maintain the messenger within the grooves of the rollers with which each is associated.

In a second embodiment of the invention the puller is provided with a substantially tubular member extending longitudinally thereof and slotted throughout its length along one side thereof. This puller is slidably mounted on the messenger by placing the tubular member over the messenger cable through the longitudinally extending slot formed in the tubular member.

A second, substantially shorter slot is formed in a bottom portion of the tubular member and a grooved roller is eccentrically mounted beneath the slot for pivotal movement into and out of the tubular member through the slot to function as a brake. A spring urges the eccentrically mounted roller into the slot such that it will engage a messenger received in the tubular member. A link extends forwardly from the eccentrically mounted roller and is engaged at its forward end by a towing ring.

With this construction, therefore, when a towing force is applied to the towing ring, the link overcomes the spring tension urging the brake into the tubular member, moving the brake out of engagement with the messenger. Again, however, if the towing force applied to the towing ring is released or relaxed sufficiently, the spring loading on the brake will move it back into engagement with the messenger and again prevent retrograde movement of the puller along the messenger.

The towing ring also extends through an opening in a downwardly depending plate member fixed to the forward end of the puller. The opening in the plate member has a slotted offset portion which allows the link to be moved forwardly far enough to allow the brake to clear the messenger sufficiently to permit it to be removed from the tubular member through the slot therein. During normal towing operations, however, the brake, although free of contact with the messenger, is positioned far enough up into the tubular member to prevent inadvertent displacement of the puller from the messenger.

BRIEF DESCRIPTION OF THE DRAWINGS

FIG. 3 is a view of the puller of FIG. 2 on line 3—3 with portions omitted for clarity;

FIG. 4 is an end view thereof with portions braken away;

FIG. 5 is a view similar to FIG. 2 but showing a second preferred embodiment of the invention;

FIG. 6 is a top view thereof;

FIG. 7 is an end view of the embodiment of FIGS. 5 and 6; and

FIG. 8 is a view taken on line 8—8 of FIG. 2.

DESCRIPTION OF THE PREFERRED EMBODIMENTS

Figure 1:
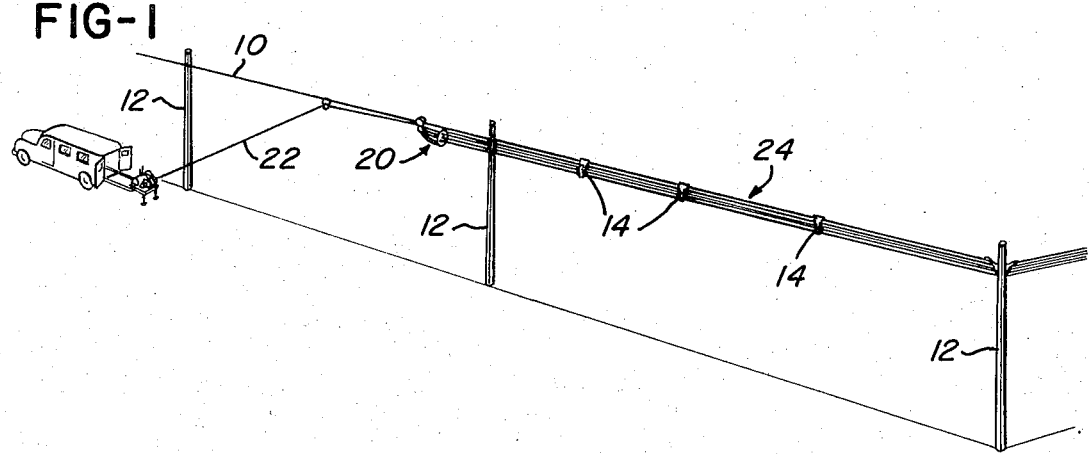
FIG. 1 is a persective view showing an embodiment of the present invention in use.

As seen in FIG. 1, a typical environment in which the present invention will be utilized will include a preinstalled messenger strand 10 supported by poles or the like 12 at regularly spaced intervals, three such poles being shown in FIG. 1 for purposes of illustration. Temporary supporting devices, such as the aerial blocks 14, which may be of conventional construction, will be mounted on the messenger at suitably spaced intervals to temporarily support the cables being installed prior to a permanent lashing operation.

Figure 2:
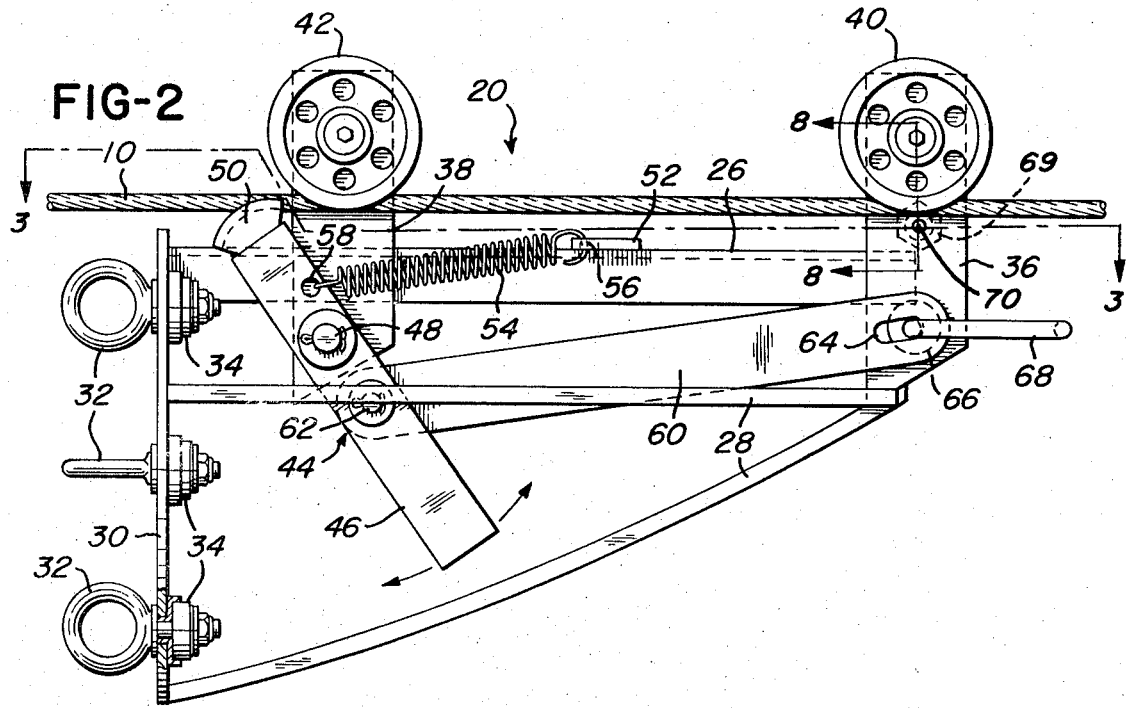
FIG. 2 is an elevational view of a puller with parts in section.

A stringing puller 20 in accordance with the present invention is mounted on the messenger and is towed therealong by a tow line 22, thereby unreeling one or more cables 24 from a supply thereof, not shown. The puller 20, as best seen in FIGS. 2 through 4 of the drawings, includes a base framework consisting of a main, substantially angle shaped frame member 26 extending longitudinally of the puller and a plurality of secondary frame members 28 which also extend longitudinally of the puller but converge toward a forward end thereof.

At the rear end of the puller, a substantially flat disk-like plate member 30 is fixed to the main and secondary frame members 26 and 28. A plurality of towing swivels 32, which may be of conventional construction, are swivel mounted on the plate 30 by means of thrust bearings 34.

Front and rear vertically extending roller supports 36 and 38 are attached to frame member 26 by welding or the like and have rotatably mounted on their upper ends grooved rollers 40 and 42 with the axes of rotation of the rollers 40 and 42 projecting transversely of the frame member 26. It will be noted, particularly from FIG. 2 of the drawings, that the forward support 36 has attached thereto by welding or the like the forward ends of the main and secondary frame members 26 and 28, while the rear support 38 has pivotally mounted thereon the brake member 44.

Brake member 44 includes a lever 46 pivotally mounted on the support 38 at 48 and a strand engaging grooved brake shoe 50 attached to its upper end. A short anchor plate 52 is attached to an upper surface of the main frame member 26 and projects transversely thereof. A coil spring 54 has one end received through an opening 56 in the plate 52 and an opposite end received in an opening 58 in the lever 46.

Thus, the spring 54 urges the lever 46 to rotate in a clockwise direction, as seen in FIG. 2 of the drawings, so that with a messenger strand 10 engaged by the grooved rollers 40 and 42, the grooved brake shoe 50 cooperates with the roller 42 to clamp the messenger and prevent retrograde movement of the puller, to the left as seen in FIG. 2 of the drawings.

A link 60 has its rearward end pivotally attached, as at 62, to the lever 46 below the pivot point 48. The link 60 extends forwardly from the lever 46 to a point adjacent the forward support 36. At its forward end the link 60 is provided with a slotted opening 64 which partially overlies a relatively large opening 66 formed in the forward support 36. A towing ring 68 is received through both the slotted opening 64 and the opening 66 and serves as a means for attaching a tow line to the puller 20.

With this construction, it will be seen that when a towing force is applied to the ring 68 the link 60 will move forward, pivoting the lever 46 about the pivot point 48 and moving the brake shoe 50 counterclockwise downwardly out of engagement with a messenger strand 10. If for any reason, however, the towing force applied to the ring 68 is either relaxed completely, as in the case of a tow line break, or relieved sufficiently to allow the spring 54 to come into operation, the lever 46 will again pivot in the clockwise direction, as seen in FIG. 2, moving the brake shoe 50 upwardly into engagement with a messenger 10, and clamp the messenger against the roller 42 and prevent retrograde movement of the puller to the left, as seen in FIG. 2.

It will be apparent, of course, that the distance from the pivot point 48 to the messenger engaging portion of the brake shoe 50 and the distance from pivot 48 to pivot 62 as well as the distance from pivot 62 to the point where ring 68 engages the forward end of slot 64 and the dimension of the opening 66 are calculated such that the shoe 50 will pivot out of engagement with the messenger 10 when the puller is being towed, but yet will pivot into engagement with the messenger when the pulling force is relieved or relaxed.

Additionally, it will be seen that the slotted opening 64 permits the lever 46 to be grasped at its lower end and pivoted forwardly, or to the right as seen in FIG. 2, lowering brake shoe 50 sufficiently to allow the messenger to be removed from the groove of roller 42. During normal towing operations, however, the brake shoe 50, although not touching the messenger, is close enough to the roller 42 to prevent the messenger from inadvertently escaping from the groove in roller 42.

Beneath roller 40 a hexagonally shaped housing 69 is threaded into plate 36 and contains a headed pin 70. A spring 71 urges pin 70 to the position shown in FIG. 8 and a retainer, such as the cross pin 71a, keeps the spring 71 within the housing 69. Pin 70 thus cooperates with roller 40 to prevent messenger 10 from becoming displaced inadvertently from the groove of roller 40. Of course, to remove the messenger from roller 40 it is necessary only to press pin 70 inwardly, to the right as seen in FIG. 8.

Turning now to FIGS. 5 through 7 of the drawings, a second preferred embodiment of the invention will be described. In the embodiment shown in FIGS. 5 through 7 of the drawings, the puller is provided with a longitudinally extending frame member 72 in the form of an elongated tubular member, slotted as at 74 along its entire length at one side thereof.

A substantially flat disk-like plate member 76 is fixed to the rear end of the member 72 with a short angle member 78 reenforcing the joint therebetween. Additionally, a plurality of secondary frame members 80 extend forwardly from the plate member 76 in converging relationship to each other and are affixed by welding or the like at their forward ends to a plate member 82 which extends downwardly from the forward end of the main frame member 72. The plate member 76, similar to the plate member 30 has fixed thereto a plurality of swivel mounted rings 84 only one of which is shown in FIGS. 5 and 6, although several, as in FIG. 7, will generally be used.

A pair of spaced parallel plate members 86 are welded to opposite sides of the bottom of the main frame member 72 and pivotally mount, as at 88, a grooved roller 90 which forms a brake member. The brake 90 has a cross shaft 92 fixed to its surface by welding or the like and a spring 94 extends from the shoe shaft 92 to a bracket 96 welded to the forward face of the plate member 76.

A link 98 is pivotally attached to shaft 92 and extends forwardly therefrom to adjacent the bracket 82. The forward end of the link 98 is provided with an eye 100 and a towing ring 102 is received through the eye 100 and an opening 104 in the bracket 82. It will be noted from FIG. 5 particularly, that the opening 104 is substantially circular in configuration but is provided with a slotted offset portion 106. Additionally, it will be noted that means is provided, as at 108, for adjusting the length of the link 98.

With the above construction, the puller may be mounted on an existing messenger strand 10 by moving the link 98 to the right, as seen in FIG. 5. In this operation, the ring 102 is moved up into the offset portion 106 of the opening 104 to permit greater forward movement of the link 98. This allows the brake 90 to move completely out of the slot 110 formed in the tubular member 72 so that a messenger cable may enter the tubular member 72 through the slot 74. Thereafter, the ring 102 is released allowing the spring 94 to move the brake 90 back into the tubular member 72 through the slot 110, wedging the messenger cable against the upper surface of the member 72.

When a towing force is applied to the puller 70 through the towing ring 102, the link 98 will move forwardly or to the right, as seen in FIG. 5, pivoting the brake 90 out of engagement with the messenger 10. However, since the pulling force applied to the ring 102 will be generally downwardly as well as forwardly, the ring 102 will not enter the offset 106 and the link 78 will not travel to its fullest extent to the right.

In this position, although the brake 90 is out of contact with the messenger 10, it is nonetheless closely enough spaced to the messenger that the messenger is prevented from escaping from the tubular member through the slot 74. Thus, inadvertent displacement of the puller from the messenger is avoided. Of course, when it is desired to remove the puller from the messenger, the offset 106 again allows the additional movement of brake 90 necessary to clear the messenger.

However, should the towing force applied to the ring 102 be relieved sufficiently the spring 94 will pivot the brake 90 back into engagement with the messenger 10 and prevent retrograde movement of the puller to the left, as seen in FIG. 5 of the drawings. As in the case of the puller as seen in FIGS. 2 through 4, the distance between the various pivot points and the dimension of the brake and link as well as the size of the opening 104 are proportioned to provide the results indicated above.

From the above it will be seen that the present invention provides a stringing puller which provides positive braking action against retrograde movement of the puller but yet moves the braking means out of engagement with the messenger during towing operations while preventing inadvertent displacement of the puller from the messenger cable.

While the forms of apparatus herein described constitute preferred embodiments of the invention, it is to be understood that the invention is not limited to these precise forms of apparatus, and that changes may be made therein without departing from the scope of the invention.

What is claimed is:

1. A stringing puller comprising:
  a. a main framework,
  b. means for supporting said framework from a messenger strand,
  c. means for attaching a cable to said framework,
  d. a towing ring for attaching a tow line to said framework,
  e. brake means for engaging a messenger strand on which said framework is supported,
  f. means mounting said brake means on said framework for movement into and out of engagement with said messenger strand,
  g. means urging said brake means into engagement with said messenger strand,
  h. link means extending from said brake means to said towing ring and acting in opposition to said urging means and maintaining said brake means out of contact with said messenger strand when said puller is pulled along said messenger strand, and
  i. means defining openings in said framework and one end of said link means and receiving said towing ring therein.

2. A stringing puller comprising:
  a. a main framework,
  b. an elongated tubular member for supporting said framework from a messenger strand,
  c. means defining a slot extending throughout the length of a side wall of said tubular member,
  d. means defining a slot through a bottom wall of said tubular member,
  e. means for attaching a cable to said framework,
  f. means for attaching a tow line to said framework,
  g. brake means for engaging through said slot in said bottom wall of said tubular member a messenger strand on which said framework is supported, h. means mounting said brake means on said framework for movement into and out of engagement with said messenger strand, i. means urging said brake means into engagement with said messenger strand, and j. means acting in opposition to said urging means and maintaining said brake means out of contact with said messenger strand when said puller is pulled along said messenger strand.

3. The puller of claim 1 wherein:

a. said link means is so proportioned that said brake means retains a messenger strand in said supporting means against inadvertent displacement therefrom when said puller is being towed along a messenger strand.

4. The puller of claim 1 wherein:

a. said brake mounting means comprises means pivotally attaching said brake means to said framework.

5. The puller of claim 1 wherein:

a. said opening in said one end of said link means comprises a substantially longitudinally extending slotted opening.

6. The puller of claim 1 wherein said opening in said framework comprises:

a. a slotted, offset portion projecting forwardly from a main portion of said opening.

7. The puller of claim 6 wherein:

a. said link means is so proportioned that said brake means retains a messenger cable in said supporting means against inadvertent displacement therefrom when said puller is being towed along a messenger strand.

8. The puller of claim 1 wherein:

a. said supporting means comprises a pair of spaced rollers engageable with a messenger strand and rotatable about axes substantially perpendicular thereto, and b. said brake means cooperates with one of said rollers when engaging a messenger strand to prevent retrograde movement of said puller along a messenger strand.

9. The puller of claim 1 wherein:

a. said framework comprises a plurality of frame members extending from a rear portion of said puller toward a forward end of said puller in converging relationship to each other.

10. A stringing puller comprising:

a. a rear, disk-like plate, b. a plurality of cable grip swivels mounted on said rear plate, c. a substantially angle shaped, longitudinally extending main frame member attached to and projecting substantially perpendicularly from said rear plate, d. front and rear vertically extending roller supports mounted on said main frame member adjacent a front end thereof and said rear plate and projecting upwardly therefrom, e. a pair of grooved rollers rotatably mounted on said roller supports above said main frame member with the axes of rotation of said rollers projecting transversely of said main frame member, f. a plurality of secondary frame members attached to said rear plate and extending forwardly to said front roller support in converging relationship to each other, g. a brake lever pivotally mounted on said rear roller support for movement about an axis extending perpendicularly of said main frame member, h. brake shoe means mounted on an upper end of said brake lever above said axis of pivoting movement of said lever and adapted to engage a messenger strand received in said grooved rollers, i. a link pivotally attached to said brake lever below said axis of pivoting movement and extending forwardly therefrom to said front roller support, j. spring means urging said brake lever to pivot said brake shoe means upwardly and forwardly into engagement with a messenger strand, k. means defining a slotted opening in a forward end of said link adjacent said front roller support, l. means defining an opening through said front roller support, and m. a pulling line ring received in said openings in said link and said forward roller support, n. the distance from said axis of pivotal movement of said brake lever to said brake shoe means and to said point of connection to said link, the distance from said point to the forwardmost surface of said slotted opening in said link and the dimension of said opening in said front roller support being such that said brake means is pivoted out of engagement with a messenger strand when said pulling line ring exerts sufficient tension on said actuating link to overcome said spring means and is pivoted into engagement with a messenger strand by said spring means when tension on said actuating link is relaxed.

11. A stringing puller comprising:

a. a rear, disk-like plate, b. a plurality of cable grip swivels mounted on said rear plate, c. a substantially tubular main frame member attached to and extending substantially perpendicularly from said rear plate, d. means defining a first slot extending the length of said main frame member through a side wall thereof intermediate the top and bottom thereof, e. said first slot permitting said main frame member to be placed on a messenger strand, f. a plurality of secondary frame members extending forwardly from said rear plate in converging relationship to each other, g. a grooved braking cam eccentrically mounted for rotation beneath said tubular main frame member, h. means defining a second slot in a bottom wall of said main frame member above said braking cam to permit said braking cam to rotate through said second slot into engagement with a messenger strand received in said main frame member, i. a link pivotally attached at a rear end thereof to said braking cam and extending forwardly therefrom, j. means defining an eye adjacent a forward end of said link, k. A bracket member depending downwardly from a forward end of said main frame member and having means defining an opening therethrough, and l. means defining a slotted offset portion extending forwardly from said opening in said bracket member, m. a pulling line ring received in said link eye and said opening in said bracket member, n. the distance from the axis of said braking cam to a messenger strand engaging portion thereof and to the point of connection to said link, the distance from said point to the forwardmost surface of said eye and the dimension of said opening in said bracket member being such that said braking cam is rotated out of engagement with a messenger strand received in said main tubular frame member when said pulling line ring exerts sufficient tension on said actuating link to overcome said spring means and is pivoted into engagement with a messenger strand when tension on said actuating link is relaxed.

* * * * *